United States Patent [19]
Tateishi

[11] Patent Number: 4,930,114
[45] Date of Patent: May 29, 1990

[54] TRACK JUMP OPERATION CONTROL APPARATUS IN A DISK PLAYER

[75] Inventor: Kiyoshi Tateishi, Saitama, Japan

[73] Assignee: Pioneer Electronic Corporation, Tokyo, Japan

[21] Appl. No.: 203,838

[22] Filed: Jun. 8, 1988

[30] Foreign Application Priority Data

Aug. 6, 1987 [JP] Japan .................................. 62-196874

[51] Int. Cl.⁵ .......................... G11B 7/00; H04N 21/08
[52] U.S. Cl. .................................. 369/32; 360/78.05; 369/124
[58] Field of Search ...................... 369/124, 44, 45, 46, 369/32; 360/78.05

[56] References Cited

U.S. PATENT DOCUMENTS

| | | | |
|---|---|---|---|
| 4,847,821 | 7/1989 | Boas | 369/32 |
| 4,853,914 | 8/1989 | Okano et al. | 369/32 |
| 4,866,687 | 9/1989 | Kasai et al. | 369/32 |

*Primary Examiner*—Steven L. Stephan
*Attorney, Agent, or Firm*—Sughrue, Mion, Zinn, Macpeak & Seas

[57] ABSTRACT

To perform a track jumping operation, fine adjustment means is forcibly driven by a speed error signal corresponding to a difference between a moving speed of an information detection point and a predetermined reference speed so that the information detecting point is controlled to jump over tracks at the predetermined reference speed and more a designated distance. Simultaneously, rough adjustment means is forcibly driven by an integrator means which integrates the speed error signal.

9 Claims, 3 Drawing Sheets

TRACK JUMP OPERATION CONTROL APPARATUS IN A DISK PLAYER

FIELD OF THE INVENTION

The present invention relates to a track jump operation control apparatus in a disk player.

BACKGROUND OF THE INVENTION

One system for reading information on a recorded disk, for example, includes using an optical pickup for radiating laser light onto a recording surface of a disk and demodulating the light reflected by or transmitted through the disk. In such a system there is provided a so-called tracking servo means acting as a find adjustment means in order to suitably control a quantity of biasing of an actuator (such as a tracking mirror for defecting the irradiation light) so that the irradiation light correctly tracks a recorded track.

Since an adjustment range of the tracking actuator is narrow a so-called slider servo means is also provided as a rough adjustment means for driving a slider motor to control a rough radial position of the pickup relative to the disk.

In order to search for recorded information in a short time, it is necessary to cause a pickup to perform a so-called jump operation so that an information detecting point of the pickup moves to jump over a plurality of tracks. In an apparatus for performing this jump operation, one suitable approach is as follows:

After a tracking servo loop and a slider servo loop are opened and a driving signal is externally applied to a tracking actuator to thereby deviate the tracking actuator, the tracking servo loop and the slider servo loop are closed so that the slider motor is driven according to a quantity of deviation of the tracking actuator.

A jump operation control apparatus using the above approach is disadvantageous in that it is difficult to repeatedly perform a so-called multi-jump operation so that the information detecting point jumps over a plurality of tracks because the setting of the slider servo means is slow; as a result of the foregoing disadvantage, it is impossible to shorten the time required for searching for information.

SUMMARY OF THE INVENTION

It is therefore an object of the present invention to solve the foregoing problem in the prior art.

It is another object of the present invention to provide a track jump operation control apparatus in a disk player in which a setting time of a slider servo means after a jump operation can be shortened.

The foregoing objects of the present invention are attained by a track jump operation control apparatus in a disk player, which is arranged such that when a fine adjustment means (which contains constructions for finely adjusting a relative position of an information detecting point of a pickup relative to a recorded disk to thereby cause the information detecting point to follow a reading track of the recorded disk) is forcibly driven, in response to a command, by a speed error signal corresponding to a difference between a moving speed of the information detecting point and a predetermined reference speed so that the information detecting point is controlled to jump over tracks at the predetermined reference speed and to move a designated distance. Simultaneously, a rough adjustment means (which contains constructions for roughly adjusting the relative position of the information detecting point so that the information detecting point is positioned within a controllable region of the fine adjustment means) is forcibly driven by an output of an integrator means which integrates said speed error signal.

BRIEF DESCRIPTION OF THE DRAWINGS

Other features and advantages of the present invention will become apparent from the following description taken in connection with the accompanying drawings, wherein.

DETAILED DESCRIPTION OF THE PREFERRED EMBODIMENTS

Embodiments of the present invention will be described hereunder with reference to the drawings.

Figure 1:
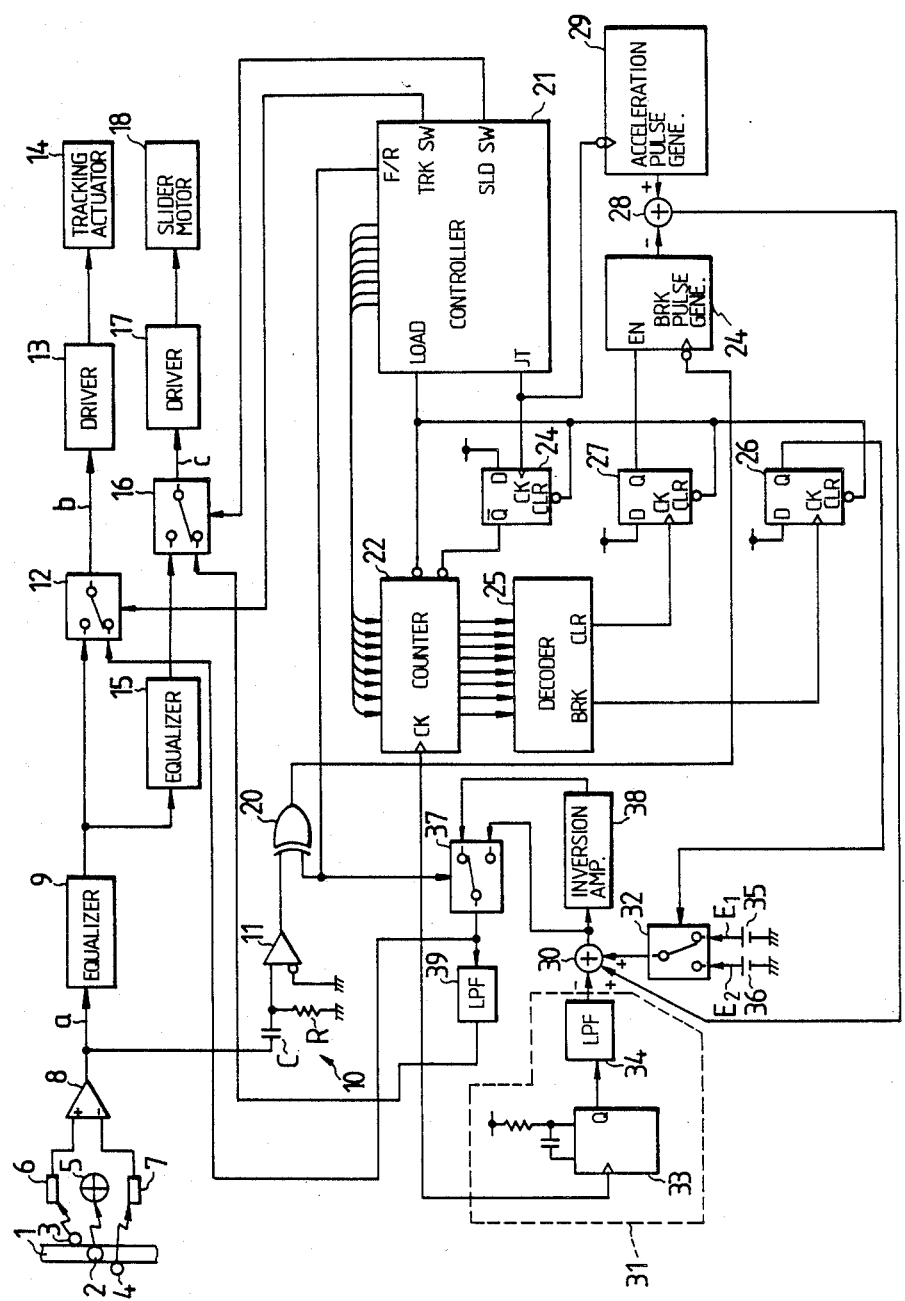
FIG. 1 is a circuit block diagram illustrating an embodiment of the present invention.

In FIG. 1, a recorded track 1 is irradiated with three light spots 2 to 4 obtained by converging laser beams in the illustrated positional relationship. That is, when the light spot 2 for detecting information is projected onto the recorded track 1 so that an information detecting point is formed on the recorded track 1, the other light spots 3 and 4 are radiated onto the opposite side edges of the recorded track 1. If the light spot 2 is displaced in the direction perpendicular to the recorded track 1, that is, in the radial direction of a recorded disk, a difference between the quantities of reflected light of the respective light spots 3 and 4 corresponds to the direction and degree of the displacement of the light spot 2. The reflected light of the respective light spots 2 to 4 are converted to electric signals by photoelectric conversion elements 5 to 7 respectively. The respective outputs of the photoelectric conversion elements 6 and 7 are supplied to a differential amplifier 8 which produces an output signal corresponding to a difference between the respective output levels of the photoelectric conversion elements 6 and 7, that is, a difference between the respective quantities of the reflected light of the light spots 3 and 4. The output signal of the differential amplifier 8 is supplied, as a tracking error signal a, to an equalizer amplifier 9.

The tracking error signal a is subject to phase compensation by means of the equalizer amplifier 9 and then supplied to a tracking actuator 14 through a change-over switch 12 and a driving circuit 13. The tracking actuator 14 is, for example, constituted by a movable portion provided with an objective means (not shown). a support portion for supporting the movable portion with a spring or the like, and means for displacing the movable portion in the radial direction relative to the recorded track 1 in response to a driving signal output from the driving circuit 13. The driving signal corresponding to the tracking error signal a is supplied from the driving circuit 13 to the tracking actuator 14 so that the light spot 2 for detecting information is controlled to accurately track the recorded track 1.

A tracking servo loop acting as a fine adjustment means for controlling the radial relative position of the information detecting point relative to the the recorded track 1 with high accuracy is formed by the above-mentioned parts. Since an adjustment range of the movable portion of the tracking actuator 14 in the tracking servo loop is extremely narrow in comparison with to the radius of the recorded disk the relative position of the information detecting point cannot be controlled over the extensive region of the whole radius of the recorded disk by using only the tracking servo loop. Provided therefore, is a slider servo loop acting as a rough adjustment means in which a slider carrying the tracking actuator 14 mounted thereon is moved in the radial direction relative to the recorded track 1, i.e., the slider servo loop functions to control the relative position of the information detecting point with low accuracy to approximately position the information detecting point at about the center of the controllable region of the tracking servo loop.

To accomplish the above operation, the output of the equalizer amplifier 9 is supplied to a driving circuit 17 through an equalizer amplifier 15 and a change-over switch 16. The output of the driving circuit 17 is supplied to a slider motor 18 for radially moving a slider (not shown) carrying the tracking actuator 14.

To accomplish further operations of the invention, the output of the differential amplifier 8 is supplied to a comparator 11 through a low-frequency cutoff filter 10 in the form of a differential circuit constituted by a capacitor C and a resistor R, and is compared with ground potential. The comparator 11 produces a pulse having a leading edge and a trailing edge in synchronism with zero-crossing of a high-frequency component of the tracking error signal The output of the comparator 11 is supplied to one of input terminals of an exclusive OR gate 20. An F/R signal output from a controller 21 is supplied to the other input terminal of the exclusive OR gate 20. The F/R signal is a high level signal which is produced when the jump operation is performed in the reverse direction (i.e. when a track jumping operation is to be conducted in a radial direction toward an inner circumference of the recorded disk). The output of the comparator 11 is passed unaltered through the exclusive OR gate 20 when the F/R signal does not exist, while an inverted signal of the output of the comparator 11 is sent out from the exclusive OR gate 20 when the F/R signal exists.

The pulse output from the exclusive OR gate 20 is supplied as a TZ signal to a clock input terminal of a counter 22 and a trigger input terminal of a brake pulse generator 24. Jump data representing the number of tracks to be jumped is supplied to the counter 22. The counter 22 is arranged to preset the jump number data therein as its count Value in response to a LOAD signal fed by the controller 21. A low-level EN signal is supplied to the counter 22 from a $\bar{Q}$ output terminal of a D-type flip-flop 24. A JT signal output from the controller 21 and the LOAD signal are respectively supplied to a clock input terminal and a clear input terminal of the D-type flip-flop 24. A power source voltage is applied to a D input terminal of the D-type flip-flop 24. The counter 22 is arranged to count down whenever it is supplied with a clock in a period when the EN signal is being produced Output data of the counter 22 is supplied to a decoder 25. The decoder 25 is arranged to output a high-level BRK signal when the value of the output data of the counter 22 becomes a predetermined value N, and to output a high-level CLR signal when the output data of the counter 22 becomes zero. The BRK signal and the CLR signal are respectively supplied D-type flip-flops 26 and 27 as trigger inputs thereof. The power source voltage is applied to the D input terminal of each of the D-type flip-flops 26 and 27. The D-type flip-flops 26 and 27 are set respectively by the leading edges of the BRK signal and the CLR signal upon generation of the BRK signal and the CLR signal respectively, so that the BRK signal and the CLR signal are latched or stored in the flip-flops 26 and 27. The LOAD signal is supplied to the CLEAR inputs terminals of each of the D-type flip-flops 26 and 27.

A Q output of the D-type flip-flop 27 is supplied to an enable input terminal of the brake pulse generator 24. The brake pulse generator 24 is arranged to be triggered by the TZ signal output from the exclusive OR gate 20 so as to output a brake pulse of a predetermined level for a period of time $T_1$. The output of the brake pulse generator 24 is supplied to an addition/subtraction circuit 28 as a subtraction input thereto. The output of a acceleration pulse generator 29 is supplied to the addition/subtraction circuit 28 as an addition input thereto The acceleration pulse generator 29 is arranged to be triggered by the JT signal generated by the controller 21 so as to output an acceleration pulse of a predetermined level for a period of time $T_2$. The output of the addition/subtraction circuit 28 is supplied to an addition/subtraction circuit 30 as an addition input thereto. A speed detection signal output from a speed detecting circuit 31 and a reference speed signal output from a change-over switch 32 are supplied to the addition/subtraction circuit 30 as subtraction and addition inputs thereto respectively. A speed error signal corresponding to the difference between the radially moving speed of the information detecting point and the reference speed is output from the addition/subtraction circuit 30.

The TZ signal output from the exclusive OR gate 20 is supplied to the speed detecting circuit 31. In the speed detecting circuit 31, the TZ signal is applied to a monostable multivibrator 33 as a trigger input thereto. A Q output of the monostable multivibrator 33 is sent out through a low pass filter (hereinafter abbreviated as "LPF") 34 as a speed detection signal having a voltage level corresponding to the radially moving speed of the information detecting point.

Output voltages $E_1$ and $E_2$ of constant-voltage sources 35 and 36 are respectively applied to two input terminals of the change-over switch 32. The voltage $E_1$ is, for example. established to be equal to the voltage level of the speed detection signal obtained when the frequency of the TZ signal output from the exclusive OR gate 20 is 10 kHz. On the other hand, the voltage $E_2$ is established to be equal to the voltage level of the speed detection signal obtained when the frequency of the TZ signal is 4 kHz. A Q output of the D-type flip-flop 26 is supplied to a control input terminal of the change-over switch 32, and the change-over switch 32 is arranged to selectively pass the voltage $E_1$ as a reference speed signal when the D-type flip-flop 26 is in a reset state, that is, when the BRK signal is not latched in the flip-flop 26 and to selectively pass the voltage $E_2$ as a reference speed signal when the D-type flip-flop 26 is in a set state, that is, when the BRK signal is latched in the flip-flop 26.

The speed error signal output from the addition/subtraction circuit 30 is supplied to one and the other input terminals of a change-over switch 37 directly and through an inversion amplifier 38 respectively. The F/R signal output from the controller 21 is supplied to a control input terminal of the change-over switch 37. The change-over switch 37 is arranged, for example, to selectively pass the output of the addition/subtraction circuit 30 when the F/R signal is at a low level, and to selectively pass the output of the inversion amplifier 38 when the F/R signal is at a high level. The output of the change-over switch 37 is supplied to the driving circuit 13 through the change-over switch 12, and at the same time supplied to the driving circuit 17 through an LPF 39 and the change-over switch 16. A high level TRKSW signal and a high level SLDSW signal are supplied from the controller 21 to respective control input terminals of the change-over switches 12 and 16. The change-over switch 12 is arranged to selectively pass the tracking error signal fed through the equalizer amplifier 9 when the TRKSW signal is not being supplied and to selectively pass the speed error signal fed from the change-over switch 37 when the TRKSW signal is being supplied. On the other hand, the change-over switch 16 is arranged to selectively pass the tracking error signal fed through the equalizer amplifiers 9 and 15 when the SLDSW signal is not being supplied, and to selectively pass the speed error signal fed through the LPF 39 when the SLDSW signal is being supplied.

The controller 21 is constituted, for example, by a microcomputer, and is arranged to calculate the number of tracks to be jumped by a jump operation. A track jumping operation is initiated in response to a search command, a double-speed command, or the like, generated through a keying operation with a key in an operation portion (not shown). As a result, the controller 21 produces the track-number data and the LOAD signal, and then produces the JT signal, the TRKSW signal and the SLDSW signal at predetermined timings.

Figure 2:
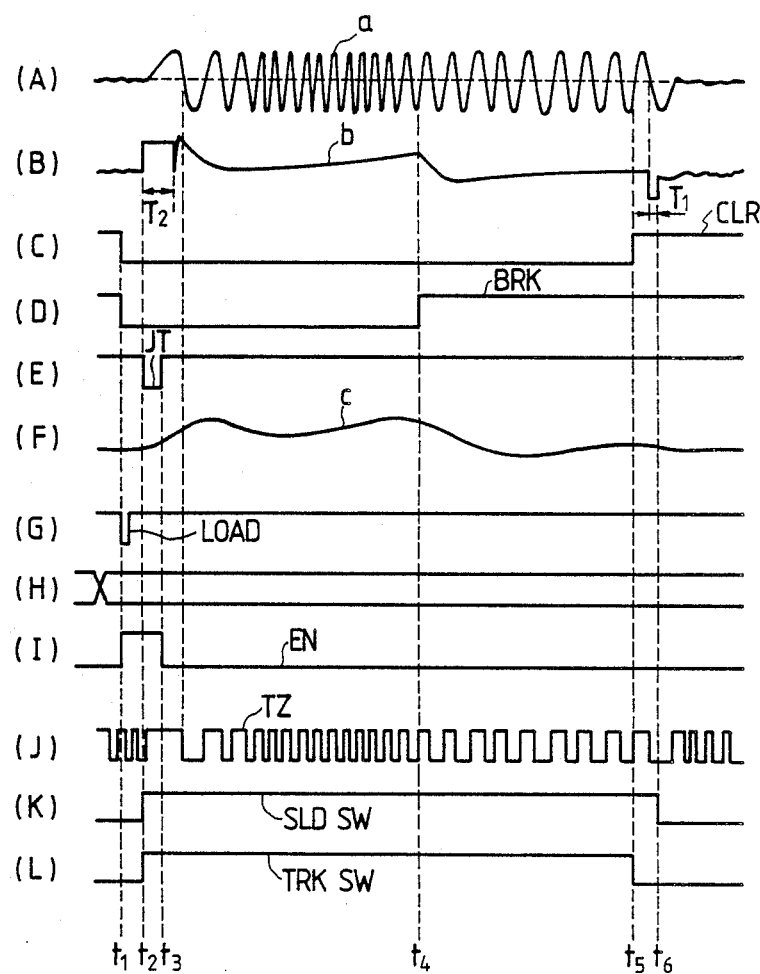
FIG. 2 is a waveform diagram illustrating the operation of various parts in the apparatus of FIG. 1.

The operation of various portions in the above-mentioned arrangement will be described with reference to FIG. 2. In FIG. 2, (A) is a waveform diagram of the tracking error signal a. (B) is a waveform diagram of the driving signal b supplied to the driving circuit 13 for driving the tracking actuator 14 (C) is a waveform diagram of the CLR signal output from the decoder 25 and latched by the D-type flip-flop 27. (D) is a waveform diagram of the BRK signal output from the decoder 25 and latched by the D-type flip-flop 26, (E) is a waveform diagram of the JT signal output from the controller 21, (F) is a waveform diagram of the driving signal c supplied to the driving circuit 17 for driving the slider motor 18 (G) is a waveform diagram of the LOAD signal output from the controller 21, (H) is a waveform diagram of the jump-number data supplied from the controller 21 to the counter 22 (I) is a waveform diagram of the EN signal output from the D-type flip-flop 24, (J) is a waveform diagram of the TZ signal output from the exclusive OR gate 20, (K) is a waveform diagram of the SLDSW signal output from the controller 21, and (L) is a waveform diagram of the TRKSW signal output out from the controller 21.

Assuming that the LOAD signal is produced at a point of time $t_1$, the jump-number data is preset in the counter 22, and at the same time the D-type flip-flops 24, 26 and 27 are reset. Thereafter, if the JT signal, the SLDSW signal and the TRKSW signal are output from the controller 21 at a point of time $t_2$, the acceleration pulse generator 29 is triggered and the change-over switches 12 and 16 are changed over at the same time, so that the control operation on the tracking servo means and the slider servo means are stopped. At the same time the speed error signal is supplied to the tracking actuator driving circuit 13 and a signal obtained by integrating the speed error signal is supplied to the slider motor driving circuit 17. If the acceleration pulse generator 29 is triggered, the acceleration pulse is produced for the time $T_2$, and the level of the speed error signal is made to be maximum by the acceleration pulse so that the tracking actuator 14 begins to be deviated suddenly and the information detecting point begins to move in the radial direction. At that time, since the D-type flip-flop 26 is in a reset state, the voltage $E_1$ is selectively passed through the change-over switch 32 and supplied to the addition/subtraction circuit 30. The speed error signal corresponding to the difference between the voltage $E_1$ and the speed detection signal is therefore supplied to the tracking actuator 14 after the time $T_2$ has passed, and the tracking actuator 14 is driven so as to cause the moving speed of the information detecting point to correspond to the voltage $E_1$. At the same time, the signal obtained by integrating the speed error signal is supplied to the driving circuit 17, so that the slider motor 18 is driven correspondingly to the quantity of deviation of the tracking actuator 14.

The D-type flip-flop 24 is brought into a set state by the leading edge of the JT signal and the EN signal is generated when the JT signal disappears (at the point of time $t_3$). The counting operation of the counter 22 is then started so that the count value of the counter 22 is decreased by one every time the leading edge of the TZ signal is generated, i.e.. whenever the information detecting point jumps over a track.

When the count value of the counter 22 becomes a predetermined value N, a BRK signal is produced (at the point of time $t_4$). and the D-type flip-flop 26 is brought into a set state by the leading edge of the BRK signal so as to latch the BRK signal. The voltage $E_2$ is selectively passed through the change-over switch 32 by the latched BRK signal, and the level of the speed error signal is lowered, so that the moving speed of the information detecting point is lowered.

When the count value of the counter 22 becomes zero thereafter, the CLR signal is output from the decoder 25 (at the point of time $t_5$). The D-type flip-flop 27 is then brought into a set state by the leading edge of the CLR signal so as to latch the CLR signal. At the same time, the TRKSW signal output from the controller 21 disappears, and the control operation of the tracking servo means is started and the radial movement of the information detecting point is stopped. The latch CLR signal is supplied to the enable input terminal of the brake pulse generator 24, so that the brake pulse is produced for the time $T_1$. The level of the speed error signal is therefore made negative so that the slider motor 18 is suddenly decelerated and stopped rotating. The SLDSW signal which has been output from the controller 21 disappears at the point of time ($t_6$) when the brake pulse disappears, and the control operation on the slider servo means is started.

In the thus arranged jump operation control apparatus, at the same time as the tracking actuator is compulsorily driven in the jump operation, the sliding motor is compulsorily driven by the signal obtained by integrating the speed error signal for driving the tracking actuator, so that the tracking actuator is deviated and simultaneously the slider carrying the tracking actuator is moved correspondingly to the quantity of deviation of the tracking actuator. Consequently, the rate of change of the quantity of deviation of the tracking actuator necessary for making the moving speed of the information detecting point equal to the reference speed becomes small. The quantity of deviation of the tracking actuator at the end of jump operation becomes small, and the quantity of movement of the slider which is moved by the operation of the slider servo means after the end of the jump operation so as to make the quantity of deviation of the tracking actuator zero becomes small. As a result of the foregoing, the time taken for setting of the slider servo means is shortened.

Figure 3:
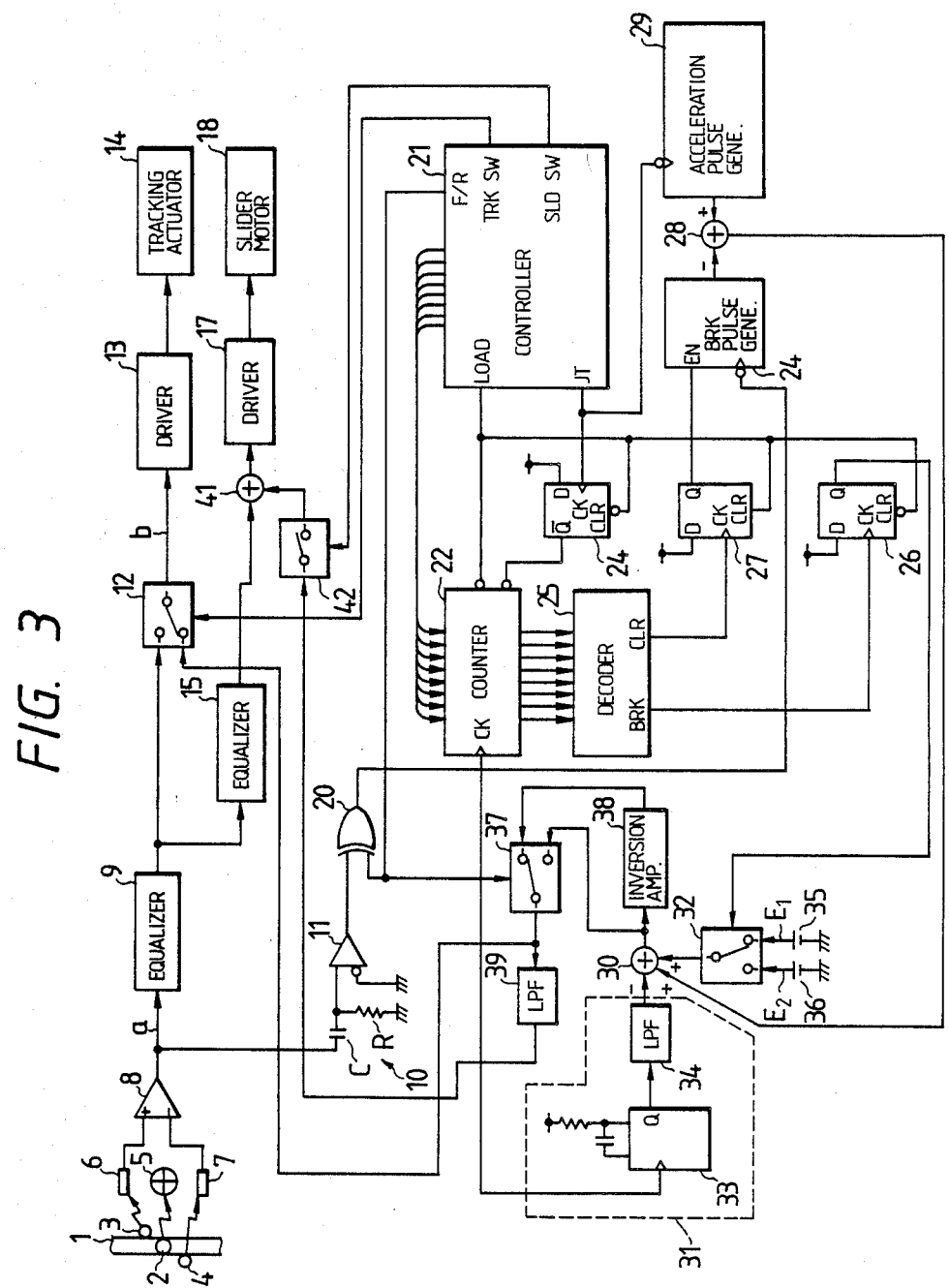
FIG. 3 is a circuit block diagram illustrating another embodiment of the present invention.

FIG. 3 is a circuit diagram illustrating another embodiment of the present invention. In FIG. 3, parts having constructions/functions equivalent to those in FIG. 1 are referenced with corresponding reference numerals.

In FIG. 3, the output of the equalizer amplifier 15 is supplied to an addition circuit 41. The output of an LPF 39 is also supplied to the addition circuit 41 through a switch 42. The addition output of the addition circuit 41 is supplied to the driving circuit 17.

The SLDSW signal is supplied to a control input terminal of the switch 42 which is arranged to switch in response to the SLDSW signal.

In the thus arranged apparatus, although the tracking error signal passed through the equalizer amplifiers 9 and 15 is continuously supplied to the driving circuit 17 for driving the slider motor 18 even during the jump operation, the output of the LPF 39 is added to the input of the driving circuit 17 during the jump operation so that the same operation as that in the apparatus of FIG. 1 is achieved.

As described above, the track jump operation control apparatus according to the present invention is arranged such that when a fine adjustment means (having constructions for finely adjusting a relative position of an information detecting point of a pickup relative to a recorded disk to thereby cause the information detecting point to follow a reading track of the recorded disk) is forcibly driven, in response to a track jumping command, by a speed error signal corresponding to a difference between a moving speed of the information detecting point and a predetermined reference speed so that the information detecting point is controlled to jump over tracks at the predetermined reference speed and move a designated distance. Simultaneously, a rough adjustment means (having constructions for roughly adjusting the relative position of the information detecting point so that the information detecting point is positioned within a controllable region of the fine adjustment means) is forcibly driven by an output of an integrator means which integrates the speed error signal. Simultaneously with the driving of a tracking servo means (acting as a fine adjustment means). therefore, a slider servo means (acting as a rough adjustment means) is driven correspondingly to the quantity of deviation of an actuator of the tracking servo means so that the quantity of deviation of the actuator of the tracking servo means at the end of the jump operation is reduced. Consequently, the quantity of control of the slider servo means for making the quantity of deviation of the tracking actuator zero after the end of the jump operation is reduced, and the setting time of the slider servo means is shortened.

What is claimed is:

1. A track jump operation control apparatus in a disk player, said control apparatus comprising:

fine adjustment means for finely adjusting a relative position of an information detecting point of a pickup relative to a recorded disk to thereby make the information detecting point follow a reading track of the recorded disk;

rough adjustment means for roughly adjusting said relative position of said information detecting point so that said information detecting point is positioned within a controllable region of said fine adjustment means:

speed detection means for producing a speed detection signal corresponding to a radial moving speed of said information detection point relative to said recorded disk;

speed error signal generation means for generating a speed error signal corresponding to a difference between said speed detection signal and a reference speed signal representing a predetermined reference speed:

integrator means for integrating said speed error signal;

wherein, to perform a track jumping operation, said fine adjustment means being forcibly driven by said speed error signal and said rough adjustment means being forcibly driven by an output of said integrator means so that said information detecting point is controlled to jump over a designated number of tracks at said reference speed.

2. A control apparatus as claimed in claim 1, wherein said fine adjustment means and said rough adjustment means are simultaneously driven during at least a portion of said track jumping operation.

3. A control apparatus as claimed in claim 2, further comprising:

reference speed signal generation means for producing said reference signal as one of a high and low reference speed signal, said high reference speed signal being produced when said fine and rough adjustment means are to be forcibly driven at a high speed during said track jumping operation, and said low reference speed signal being produced when said fine and rough adjustment means are to be forcibly driven at a lower speed than said high speed during said track jumping operation.

4. A control apparatus as claimed in claim 3, further comprising:

brake means for producing a braking signal when a track jumping operation is completed, said braking signal being applied to said speed error signal generation means.

5. A control apparatus as claimed in claim 4, further comprising:

acceleration pulse generator means for producing an acceleration pulse signal when a track jumping operation is initiated, said acceleration pulse signal being applied to said speed error signal generation means.

6. A control apparatus as claimed in claim 5, further comprising:

track jumping control means including counter means for monitoring a number of tracks jumped during a track jumping operation, said track jumping control means for controlling a track jumping operation of said control apparatus according to an output of said counter means.

7. A control apparatus as claimed in claim 6, wherein said counter is initially set to contain a count corresponding to a number of tracks desired to be jumped, said count then being decremented each time a track is jumped.

8. A control apparatus as claimed in claim 7, wherein said reference speed signal generation means produces said high reference speed signal during an initial portion of said track jumping operation, and then, when when said counter means has been decremented below a predetermined count, said reference speed signal generation means switches to produce said low reference speed signal during a remaining portion of said track jumping operation.

9. A control apparatus as claimed in claim 8, further comprising:

tracking servo means for controlling a tracking operation during non-track jumping operations.

* * * * *